US010743705B2

(12) United States Patent
Glucksman et al.

(10) Patent No.: US 10,743,705 B2
(45) Date of Patent: Aug. 18, 2020

(54) COFFEE BREWING APPLIANCE WITH VARIABLE OPERATING PARAMETERS

(71) Applicant: Appliance Development Corporation, Danvers, MA (US)

(72) Inventors: Dov Z. Glucksman, Winchester, MA (US); Andrew J. Rojee, Norfolk, MA (US); Brandon M. Walsh, Millis, MA (US)

( * ) Notice: Subject to any disclaimer, the term of this patent is extended or adjusted under 35 U.S.C. 154(b) by 291 days.

(21) Appl. No.: 15/958,170

(22) Filed: Apr. 20, 2018

(65) Prior Publication Data
US 2018/0303271 A1 Oct. 25, 2018

Related U.S. Application Data

(60) Provisional application No. 62/488,140, filed on Apr. 21, 2017.

(51) Int. Cl.
| A47J 31/10 | (2006.01) |
| A47J 31/52 | (2006.01) |
| A47J 31/56 | (2006.01) |
| A47J 31/44 | (2006.01) |
| A47J 31/057 | (2006.01) |

(52) U.S. Cl.
CPC ............. *A47J 31/10* (2013.01); *A47J 31/057* (2013.01); *A47J 31/4439* (2013.01); *A47J 31/4457* (2013.01); *A47J 31/525* (2018.08); *A47J 31/56* (2013.01); *A47J 2203/00* (2013.01)

(58) Field of Classification Search
CPC ........ A47J 31/10; A47J 31/057; A47J 31/525; A47J 31/56; A47J 31/4439; A47J 31/4457; A47J 2203/00; A47J 31/5253; A47J 31/5251
See application file for complete search history.

(56) References Cited

U.S. PATENT DOCUMENTS

| 9,192,260 | B2 | 11/2015 | Glucksman | |
| 2018/0310754 | A1* | 11/2018 | de Graaff | A23L 2/54 |
| 2019/0053656 | A1* | 2/2019 | Locher | A47J 31/46 |
| 2019/0142213 | A1* | 5/2019 | Zernhelt | A47J 31/56 |
| | | | | 99/281 |

* cited by examiner

*Primary Examiner* — Rick K Chang
(74) *Attorney, Agent, or Firm* — Frank Marino (57) ABSTRACT

An infused beverage making apparatus has an affixed or remotely disposed control interface and a processor. The processor receives inputs from the user control interface and measurements from a plurality of sensors and controls various infused beverage qualities according thereto.

19 Claims, 7 Drawing Sheets

Fig. 7A - Main Startup and Errors Subflowchart 600A

Fig. 7C - Single Serve Section Subflowchart 600c

COFFEE BREWING APPLIANCE WITH VARIABLE OPERATING PARAMETERS

RELATED APPLICATION

This application claims the benefit of U.S. Provisional Application No. 62/488140 filed on 21 Apr. 2017, No. 62/446579, the teachings of which are claimed herein by reference in their entirety.

FIELD OF THE INVENTION

This invention generally relates to an electric appliance for infusing hot beverages. More specifically this invention relates to a method and apparatus for controlling the operation of the appliance through programmable controls including a series of inputs and outputs.

BACKGROUND OF THE INVENTION

In early 2017, the Specialty Coffee Association of America (SCAA) merged with the Specialty Coffee Association of Europe (SCAE) to form the Specialty Coffee Association (SCA) which is recognized as a global authority on brewing coffee. The SCA adopted a written program drafted by SCAA in January of 2014 for testing home brewing appliances and awarding certification to the appliances that passed that test program, which is considered an important marketing tool by manufacturers of coffee brewers. The test requirements are strict and are based on what is considered by the experts to be the most important factors contributing to the quality of the resulting beverage.

The program identifies and checks compliance with eight different parameters before granting certification, as listed below:

1. Coffee Volume

The volume of the brew basket must be sized in proportion to the beverage receiver's maximum capacity as stipulated by the manufacturer. Minimum technical requirement is for brew basket capacity to accommodate the Gold Cup Ratio weight of coffee per maximum capacity (~55 grams per liter) without overflowing from the basket due to the swelling of the coffee grounds during the brew cycle. This allowance should be about 50% of the bed depth of the coffee. Best results in uniformity of extraction are obtained with coffee bed depths between 2.5 and 5.0 cm, but these dimensions are not a requirement for the certification.

2. Brewing Time

The coffee brewer must be able to cycle its full-capacity water volume through the coffee grounds within the prescribed amount of time. For a brewer at maximum coffee and water capacity, the minimum technical requirement is for the water contact time with the coffee grounds shall be more than 4 minutes but less than 8 minutes for all brewers operating under standard temperature and pressure at the manufacturer's stated design voltage, depending on grind. Under no circumstances will water contact times in excess of 8 minutes be acceptable in meeting the certification requirements.

3. Brewing Temperature

The coffee brewer must be able to cycle the gross water volume through the coffee grounds within the prescribed temperature range. Minimum technical requirement is for the water temperature at the point the water contacts the coffee grounds to reach 92° C. within the first minute, maintain at least that temperature (92° C.) for the remainder of the brew cycle, and never exceed 96° C. Measurement of brewing temperatures will be made by using an RTD (Resistive Temperature Device) placed at the top and in the center of the bed of coffee in the brew basket.

4. Beverage Preparation

The coffee brewer must be able to produce a beverage with the prescribed range of solubles concentration and solubles yield. The brewer will be evaluated at stated full capacity as well as at the one-liter brew water volume. In situations where 1 liter is the maximum capacity of the brewer, the 0.5-liter brew will also be tested. Testing will begin with a coffee/water ratio of 55 g/L but will be adjusted depending on the grind and contact time to produce a brew within the Gold Cup zone of the brewing control chart.

Minimum technical requirement is for beverage strength (solubles concentration) of between 1.15% and 1.35% resulting from an extraction (solubles yield) of between 18.0% and 22.0% from the weight of coffee in the brew basket, as determined by a coffee refractometer and brewing control chart. All samples measured on the coffee refractometer are filtered prior to measurement. The grind of the coffee will be adjusted for the water contact time of the brewer in order to achieve these results whenever possible, within the specified grind parameters (see below testing procedures). Brewers must be able to meet these requirements at both full capacity and a 1 liter capacity in order to be certified by the SCAA. Brewers with the full capacity of 1 L will also be tested at 0.5 L.

5. Uniformity of Performance

To assure the brewer model is both consistent and reliable; it will be tested for uniformity of performance. For this test, a minimum of 5 coffee brewers will be evaluated. If a brewer manufacturer has never submitted a model to the SCAA before, up to 10 individual brewers may be requested for additional testing. During testing, at least 10 separate brew cycles will be run on each brewer to evaluate solubles concentration using the coffee refractometer method and extraction calculated using the Coffee Brewing Control Chart. All samples will be filtered prior to measurement on the coffee refractometer. The coffee brew resulting from these 10 tests must range between 1.15% to 1.35% solubles concentration for all individual brewers tested. The corresponding range for solubles yield must fall between 18.0% and 22.0%.

6. Uniformity of Extraction

At a minimum, all of the coffee in the brew basket must be wetted during the first minute of brewing to give opportunity for proper extraction.

Brewers will receive a numerical rating based on the average uniformity of extraction factor as determined by the SCAA Uniformity of Extraction Procedures for the weight of coffee at a used for the maximum water volume capacity of the brewer as stated by the manufacturer or to the SCAA Gold Cup Ratio of 55 g/L. The rating number is calculated by comparing residual soluble solids in the outside, middle, and inside areas of the wet coffee grounds in the brew basket. The result is multiplied by 100 to convert the percentage to a whole number. The Index Rating is 0-100, with 100 indicating perfect uniformity of extraction. An average uniformity rating number of 60 would be considered "good," a rating number above 75 would be considered "excellent," and a rating number above 90 would be "outstanding." All ratings below 60 would be listed as "needs improvement" and would result in the brewer not passing SCAA testing and therefore needing improvement for future brewer certification by the SCAA.

7. Beverage Clarity

Excessive sediment in the brewed coffee should be avoided. If sediment is present, the amount of will be measured in the following way: 100 grams of brewed coffee is poured through a filter paper of known weight, which is dried and weighed again. The increase in the weight of the paper is the weight of the sediment. No equipment that produces sediment of more than 75 milligrams per 100 milliliters of brewed coffee will be accepted. The brewer must produce less than 75 milligrams of sediment per 100 milliliters of brewed coffee to be certified by the SCAA.

8. Holding Receptacle & Temperature

The container that receives the coffee after brewing must accommodate the quantity of coffee for which the brewing equipment is designed at the maximum water volume capacity designated by the manufacture and maintain the temperature of the brewed coffee at the correct holding temperature. Minimum technical requirement is for the beverage receiver to maintain the temperature of the coffee no lower than 80 degrees C. and no higher than 85 degrees C. during the first thirty (30) minutes of the holding time. During this time, at no point should the temperature of the coffee increase due to a heating element.

Of the many hundreds of different coffee brewers available for sale in the US just a handful have passed the rigorous test prescribed by the SCAA in the three first years since the standard and the test program were established. Knowing how most coffee makers heat the water used for infusion it becomes apparent to a person familiar with the art why it would be most difficult for these coffee makers to achieve the performance target of sections 2 and 3 of the standard, namely: Brewing Time and Brewing Temperature. The reason for the difficulty in achieving these two factors lies in the design of the "horse shoe" shaped heaters typically used in most coffee makers, which cannot deliver water at precise temperature throughout the brewing cycle and are also limited in their wattage, thus they would require a longer brew cycle than 8 minutes, which is the upper end allowed by SCAA standard.

There is therefore the need, and it is an object of the present invention to provide, an apparatus having the structure, controls, and processes for creating infused beverages eligible for SCAA certification.

There is also the need, and it is also an object of the present invention to provide such an apparatus capable of providing such infused beverages in up to 1.8-liter quantities.

There is also the need, and it is also an object of the present invention to provide such an apparatus also capable of selectively providing such infused beverages in one cup quantities.

There is also the need, and it is also an object of the present invention to provide such an apparatus able to provide variable taste and quality characteristics in the resulting infused beverage.

There is also the need, and it is also an object of the present invention to provide such an apparatus having a logic system that accepts and translates specific taste and quality inputs into relevant physical parameters which may include brew temperatures, brew times, and a ratio of coffee grounds to water, and uses those to provide variable taste and quality characteristics in the resulting infused beverage.

There is also the need, and it is also an object of the present invention to provide such an apparatus which communicates wirelessly with a portable device such as a smart phone a tablet or a computer so that the user may select a taste and/or quality profile for the infused beverage remotely.

Additional needs and objects will become apparent by review of the disclosure herein.

SUMMARY OF THE INVENTION

The invention may be embodied in or practiced using an electric appliance for infusing hot beverages in combination with a system and method for controlling the operation of the appliance through programmable controls including a series of inputs and outputs. Some such inputs may originate from within the appliance and some may originate remotely such as from a smart phone, a computer or a tablet employing an application (App) to customize the conditions under which the infusion is performed. The appliance may include wireless communication means such as Bluetooth or Wi-Fi for communicating with the remote source mentioned here.

The new and unique apparatus and system disclosed herein is based on combining a coffee brewing system which is structurally capable of providing infused beverages eligible for SCAA certification with sensors and programming that enable the system to respond to various user commands, or stored programs that may be retrieved by the user. For example, a new brewing system within the present invention may provide brewing conditions as specified by the SCAA standard referred to here. It may also be used to produce a variety of hot beverages based on different modes of brewing coffee or steeping tea and other hot beverages requiring shorter or longer brew cycles, higher or lower temperatures and larger or smaller brewed portions. The system may also limit the temperature at which water is to be delivered in response to the prevailing atmospheric pressure, as might be experienced in higher elevations. The system may provide the ability to vary taste and quality characteristics of the infused hot beverage by programming to control the volume of water delivered for infusion, its ratio to the amount of infusible materials being used, the water delivery rate, the infusion temperature, and the infusion time.

Note that throughout the text the terms "infuse" and "brew" shall be used interchangeably; the intended meaning of these terms is the process where infusible materials, such as, but not limited to, ground coffee or tea leaves stay in contact with water for infusing the water with substance extracted from the infusible materials, such as oils, acids, flavors and aromatic substances.

The invention may be embodied in or practiced using an apparatus for making infused beverages having a water heating container with an electric heater and a water level sensor, a water reservoir in fluid communication with the water heating container, a beverage receiving container, an infusible materials container, an air delivery system including a pump and valving, conduit for providing water from the water heating container through the infusible materials container, a thermal sensor in communication with the water container, a weight sensor in communication with the infusible materials container, a pressure sensor in communication with ambient pressure and the conduit, a user control interface, and a processor in communication with the user control interface, the heater, the pump, the valving, the thermal sensor, the weight sensor, the water level sensor, and the pressure sensor.

The processor may be adapted to receive input parameters from the user control interface and measurements from the thermal sensor, weight sensor, pressure sensor, and water level sensor and to control the heater, valve and pump according thereto.

The processor may control pumping time according to the received input parameters and measurements. The processor may control a volume of water delivered from the water heating container into infusible materials container according to the received input parameters and measurements. The apparatus of claim A1 wherein the processor controls a pumping rate according to the received input parameters and measurements. The apparatus of claim A1 wherein the processor controls heater on time according to the received input parameters and measurements. A6. The apparatus of claim A1 wherein the processor controls a heater power level according to the received input parameters and measurements. The apparatus of claim A1 wherein the input parameters from the user control interface include a beverage strength input and the measurements from the weight sensor include an infusible-materials weight measurement; and the processor compares the beverage strength input to the infusible materials weight measurement to control one or both of a pumping time and a pumping rate according thereto. The apparatus of claim A1 wherein the input parameters from the user control interface include a beverage temperature input and the measurements from the thermal sensor include a water temperature measurement; and the processor compares the beverage temperature input to the water temperature measurement to control one or both of a heater on time and a heater power level according thereto. The apparatus of claim A1 wherein the input parameters from the user control interface include one or both of a beverage strength input and a beverage temperature input, and the measurements from the weight sensor include an infusible materials weight measurement, from the thermal sensor include a water temperature measurement, and from the pressure sensor include an ambient pressure measurement; and the processor compares one or both of the beverage strength input and the beverage temperature input to one or more of the infusible materials weight measurement, the water temperature measurement, and the ambient pressure measurement, to control one or more of a heater on time, a heater power level, a pumping time, and a pumping rate according thereto. The apparatus of claim A1 wherein the infusible materials are ground coffee and the input parameters from the user control interface include a default coffee beverage quality input and the measurements from the thermal sensor include a water temperature measurement, from the weight sensor include a ground coffee weight measurement, and from the pressure sensor include an ambient pressure measurement; and the processor compares the default coffee beverage quality input to the water temperature measurement, the ground coffee weight measurement, and the ambient pressure measurement to control one or more of a heater on time, a heater power level, a pumping time, and a pumping rate, and to deliver a coffee beverage to the beverage receiving container that is in accordance with Specialty Coffee Association coffee standards according thereto. The apparatus of claim A1 wherein the user control interface is separate from or separable from the apparatus and adapted for wireless communication with the processor. The apparatus of claim A1 wherein the beverage receiving container is one of a cup, a carafe, or selectably interchangeable therebetween, and the input parameters from the user control interface include a beverage quantity input and the processor controls one or more of a heater on time, a heater power level, a pumping time, and a pumping rate according thereto. The apparatus of claim A1 wherein the input parameters from the user control interface include one or both of a beverage strength input and a beverage quantity input, and the measurements from the weight sensor include an infusible materials weight measurement, and from the water level sensor include a water level measurement; and the processor compares one or both of the beverage strength input and the beverage quantity input to one or both of the infusible materials weight measurement, and the water level measurement, to control one or more of a heater on time, a heater power level, a pumping time, and a pumping rate according thereto. The apparatus of claim A1 further comprising a beverage receiving container temperature sensor and a beverage receiving container heater, and wherein the input parameters from the user control interface include a beverage receiving container temperature input, and the measurements from the beverage receiving container temperature sensor include a beverage receiving container temperature measurement; and the processor compares the beverage receiving container temperature input and the beverage receiving container temperature measurement, to control one or both of a beverage receiving container heater on time and a beverage receiving container heater power level according thereto. The apparatus of claim A1 wherein the measurements from the pressure sensor include a conduit pressure measurement, and the processor causes a warning signal when the conduit pressure measurement exceeds a predetermined pressure level. An apparatus for making infused beverages comprising: a water heating container with an electric heater and a water level sensor; a water reservoir in fluid communication with the water heating container; a beverage receiving container comprising one of a cup, a carafe, or selectably interchangeable therebetween; an infusible materials container; an air delivery system including pump and valves; conduit for providing water from the water heating container through the infusible materials container; a thermal sensor in communication with the water container; a weight sensor in communication with the infusible materials container; a pressure sensor in communication with ambient pressure and the conduit; a user control interface; a processor in communication with the user control interface, the heater, the pump, the valve, the thermal sensor, the weight sensor, the water level sensor, and the pressure sensor; wherein the processor is adapted to receive input parameters from the user control interface and measurements from the thermal sensor, weight sensor, and pressure sensor, the water level sensor and to control the heater, the valve and the pump according thereto. The apparatus of claim B1 wherein the input parameters from the user control interface include a beverage strength input and the measurements from the weight sensor include an infusible materials weight measurement; and the processor compares the beverage strength input to the infusible materials weight measurement to control one or both of a pumping time and a pumping rate according thereto. The apparatus of claim B1 wherein the input parameters from the user control interface include one or both of a beverage strength input and a beverage temperature input, and the measurements from the weight sensor include an infusible materials weight measurement, from the thermal sensor include a water temperature measurement, and the from the pressure sensor include an ambient pressure measurement; and the processor compares one or more of the beverage strength input and the beverage temperature input to one or more of the infusible materials weight measurement, the water temperature measurement, and the ambient pressure measurement, to control one or more of a heater on time, a heater power level, a pumping time period, and a pumping rate according thereto. The apparatus of claim B1 wherein the infusible materials are ground coffee and the input parameters from the user control interface include a default coffee beverage quality input and the measurements from the thermal sensor include a water temperature measurement, from the weight sensor include a ground coffee weight measurement, and from the pressure sensor include an ambient pressure measurement; and the processor compares the default coffee beverage quality input to the water temperature measurement, the ground coffee weight measurement, and the ambient pressure measurement to control one or more of a heater on time, a heater power level, a pumping time and a pumping rate, and to deliver a coffee beverage to the beverage receiving container that is in accordance with Specialty Coffee Association coffee standards according thereto.

The foregoing summary, as well as the following detailed description, will be better understood when read in conjunction with the appended drawings. To illustrate the disclosure, there are shown in the drawings an embodiment which is presently preferred. It should be understood, however, that the disclosure is not limited to the precise arrangements and instrumentalities shown.

BRIEF DESCRIPTION OF THE DRAWINGS

The various objects, advantages and novel features of this invention will be more fully apparent from a reading of the following detailed description of an exemplary embodiment thereof, in conjunction with the accompanying drawings in which like reference numerals refer to like parts, and in which.

DESCRIPTION OF AN EXEMPLARY EMBODIMENT

Figure 1A:
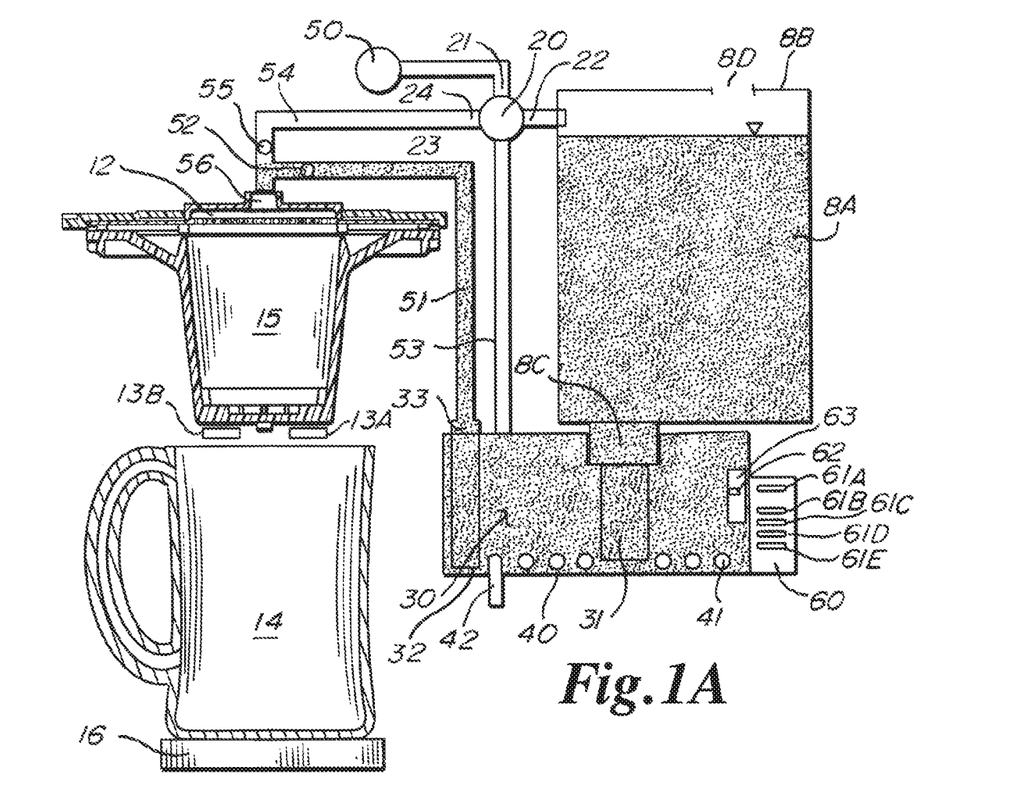
FIG. 1A is a schematic drawing of the coffee brewing apparatus according to the invention wherein one mug of coffee is being brewed at a time.

FIG. 1A is a schematic drawing of the coffee brewing apparatus according to the invention; it shows the water tank 8A with a vented lid 8B, filled with water close to its top, the water tank is seated on the water heating container 30 in a leak tight manner, known in the art, the outlet 8C of the tank includes a check valve 8D and communicates with a water inlet tube 31, integral to the water heating container, with its lower opening proximate the base plate 40 of the water heating container, so that water flowing from the tank would enter the water heating container near its bottom where electric heating coil 41 is located. This is to ensure that the cold water entering the water heating container passes by the electric coil 41 to be heated. A temperature sensor 42 projects into the water heating container through the base plate 40 designed to sense the water temperature near the bottom of the water heating container. In fact, the temperature sensor 42 is also located near the open end 32 of the water outlet tube 33 to sense the water temperatures as the water exits the water heating container and enters the outlet tube during the brewing process. The water outlet tube 33 is connected to a hot water delivery line 51 that includes a check valve 52 leading to the upper half of the hot water plenum 12. also shown is an air-line 53 that connects to the top of the water heating container, it delivers pressurized air into the water heating container to displace the hot water and deliver it into the brew chamber 12 where the infusion takes place. Also shown are an air pump 50 and a four-port valve 20. The four-port valve is connected to the air pump via port 21; to the top the water heating container through port 23. It is also connected to an air-line 54 leading to the brew chamber via a check valve through port 24; it is also connected to the atmosphere through port 22.

A water level sensing system is provided in conjunction with the water heating container 30, said water heating system may include a float 63 with an embedded magnet 62 that rises and falls with the water level, and a series of reed switches 61 A, B, C, D, and E, designed to be activated by the magnetic flux generated by float 63 with embedded magnet 62. Thus, each time that the magnet 62 passes by a reed switch a signal will be transmitted to the control circuit to be used in determining the remaining volume of hot water in water heating container. The top reed switch 61A is used to signal that the water heating container is full. The bottom reed switch 61E is used to signal that the water heating container is nearly empty.

It should be recognized that water level sensors based on other physical principles may be used such as by measuring the electrical conductivity between two submerged electrodes, by measuring the electrical capacitance of the container, by recording the weight of the container as water is delivered from the container.

A control system, not shown, and being referred to further in the specification includes timers which in conjunction with the signals generated by the reed switches are programmed to calculate the rate of flow out of the water heating container, as being the ratio of the volume of water corresponding to the distance between two consecutive reed switches and the time lapsed between the signals generated as the float passes by these two reed switches. That information may be used to determine at all time what volume of water had been delivered as a function of the time lapsed. It should though be understood that the water flow rate is not constant throughout the emptying of the water heating container. It was found that that rate diminishes as the remaining volume in the tank is reduced, due to the compressibility of the air that fills the volume of the tank being vacated by the water.

Also shown is the brewing chamber 15 used for holding ground coffee during the infusion process. FIG. 1A also shows a coffee mug 14 placed on a platform 16, for keeping the mug near the outlet of the brew basket. Platform 16 may be placed at different heights depending on the size of the mug.

Figure 1B:
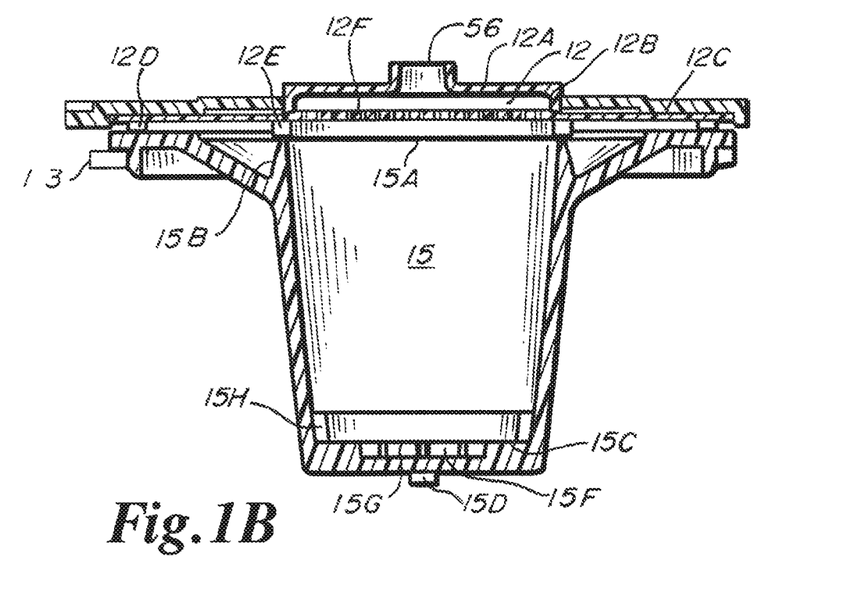
FIG. 1B is a cross sectional view of the brew chamber of the coffee brewing apparatus of FIG. 1A.

The brew chamber 15 rests on two load cells 13A and 13B calibrated to indicate the weight of the ground coffee as it is being fed into the brew chamber. The weight of the coffee is used as part of the input into the unit logic. The brew-chamber is shown in greater detail in FIG. 1 B.

FIG. 1B shows in greater detail the Brew-chamber of FIG. 1A, including: a hot water plenum 12, comprising a hot water inlet 56 communicating with the interior of the plenum 12 comprising a cover 12A, a side wall 12B, a bottom plate 12C with a large circular seal 12D and a small circular seal 12E. A portion of bottom plate 12C, within the confines of circular seal 12E features a multitude of apertures 12 F for delivery of hot water, in the form of a multitude of streams to help distribute the hot water evenly over the surface of the coffee grounds.

The brew basket 15 comprises an open top 15A defining an interior of the brew basket, through which open top ground coffee may be placed into the brew basket. The open top is surrounded by a lip 15B designed to seal against small circular seal 12E. The brew chamber 15 further includes a bottom 15C with an elongated spout 15D and side wall 9E extending from the outer perimeter of bottom 15C. the inside of the bottom 15C is provided with a multitude of upstanding radial ribs 15F extending from the spout 15D to the side wall, said ribs support a fine mesh filter unit used to hold back solid coffee particles from flowing out with the liquid coffee. Filter unit comprising a filter mesh 15G permanently affixed to an outer ring 15H. Filter unit may be removed by user for cleaning.

Figure 2A:
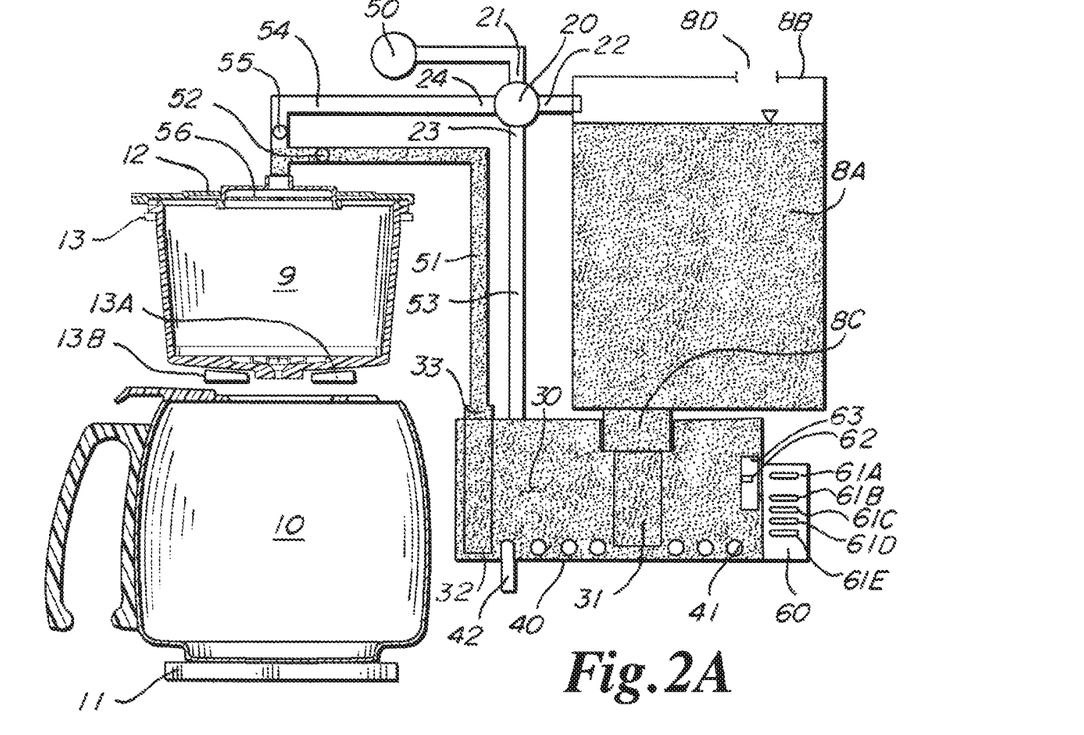
FIG. 2A is a schematic drawing of the coffee brewing apparatus of FIG. 1A wherein a whole carafe of coffee is brewed.

FIG. 2A is like FIG. 1A, except for the brew-chamber 9, being sized to efficiently brew sufficient coffee to fill a whole carafe FIG. 2A shows the glass carafe 10 placed on a heater plate 11, for keeping the content of the carafe warm for a while after the coffee was brewed. The heater plate contains an electric heating element, not shown and a temperature sensor, not shown.

Figure 2B:
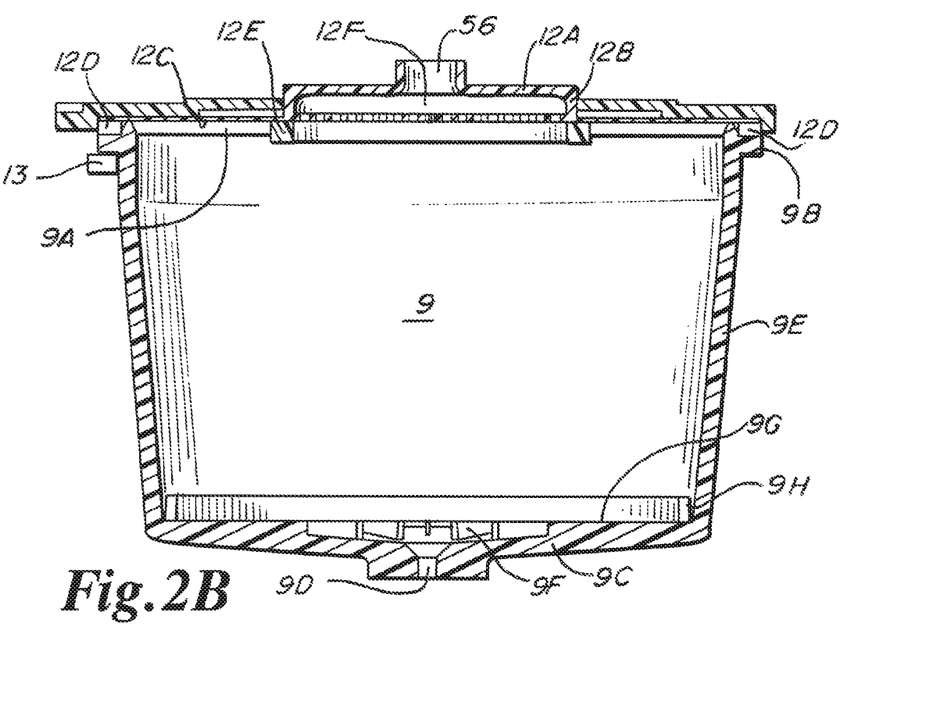
FIG. 2B is a cross sectional view of the brew chamber of the coffee brewing apparatus of FIG. 2A.

The brew chamber 9, rests on two load cells 13A and 13B calibrated to indicate the weight of the ground coffee as it is being fed into the brew chamber. The weight of the coffee is used as part of the input into the unit logic. The brew-chamber is shown in greater detail in FIG. 2 B.

FIG. 2B shows in greater detail the hot water plenum comprising a hot water inlet 56 communicating with the interior of the plenum 12 comprising a cover 12A, a side wall 12B, a bottom plate 12C with a large circular seal 12D and a small circular seal 12E. A portion of bottom plate 12C, within the confines of circular seal 12E features a multitude of perforations 12F for delivery of hot water. The bottom plate of the plenum is designed to seal against the top of the brew basket 9. FIG. 2

The bottom plate 12 C of the plenum is designed to seal against the top of the brew basket 9. The brew basket 9 comprises an open top 9A defining an interior of the brew basket, through which open top ground coffee may be placed into the brew basket. The open top is surrounded by a flange 9B designed to seal against large circular seal 12D. The brew chamber 9 further includes a bottom 9C with an elongated spout 9D and side wall 9E extending from the outer perimeter of bottom 9C to the open top 9A. the inside of the bottom 9C is provided with a multitude of upstanding radial ribs 9F extending from the spout 9D to the side wall, said ribs support a fine mesh filter unit used to hold back solid coffee particles from flowing out with the liquid coffee. Filter unit comprising a filter mesh 9G permanently affixed to an outer ring 9H. Filter unit may be removed by user for cleaning.

FIGS. 3, 4, 5 and 6 show the appliance unit 1 according to the invention comprising an enclosure 100, for containing all the components required for the operation of the brewing system as previously described. Visible is the water container 8 with its carrying handle 8E as well as a drawer 101 for storing parts of the appliance when not in use, including a pull-handle 105. Also shown is a user interface panel 200, comprising a touch screen 201 and control buttons 202. The unit also includes a brew chamber holder 102, for supporting either brew chamber 9 or 15, as required. Not shown is a load cell positioned at the bottom of the bottom brew-chamber holder 102; said loadcell is calibrated to accurately record and/or display the weight of coffee grounds as they are deposited by the user into the brew chamber.

Figure 3:
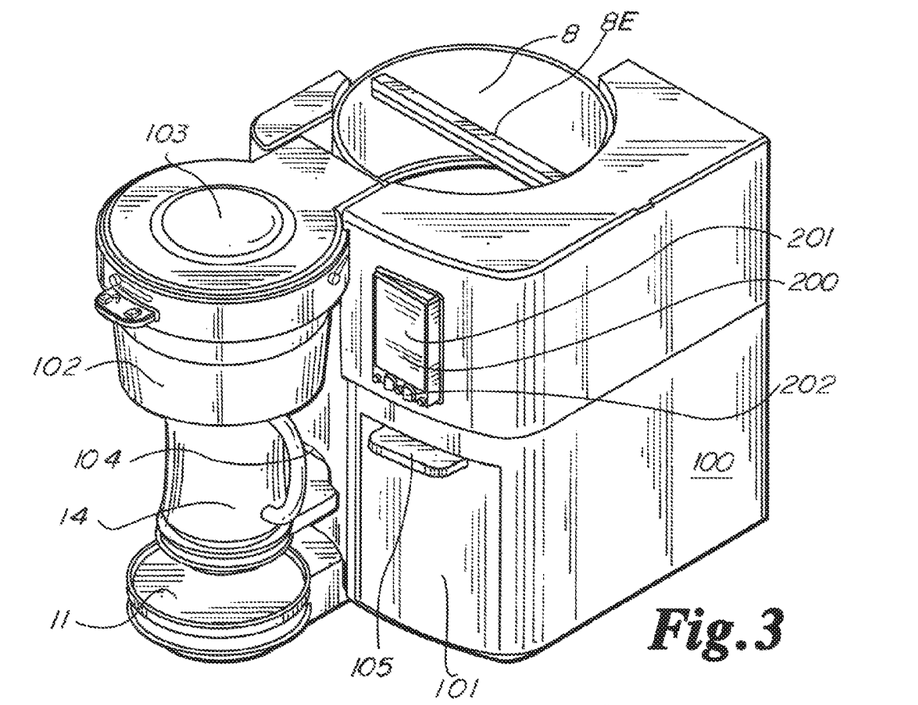
FIG. 3 is an isometric view of the coffee brewing apparatus of FIG. 1A shown with a mug placed under the brewing chamber.
Figure 4:
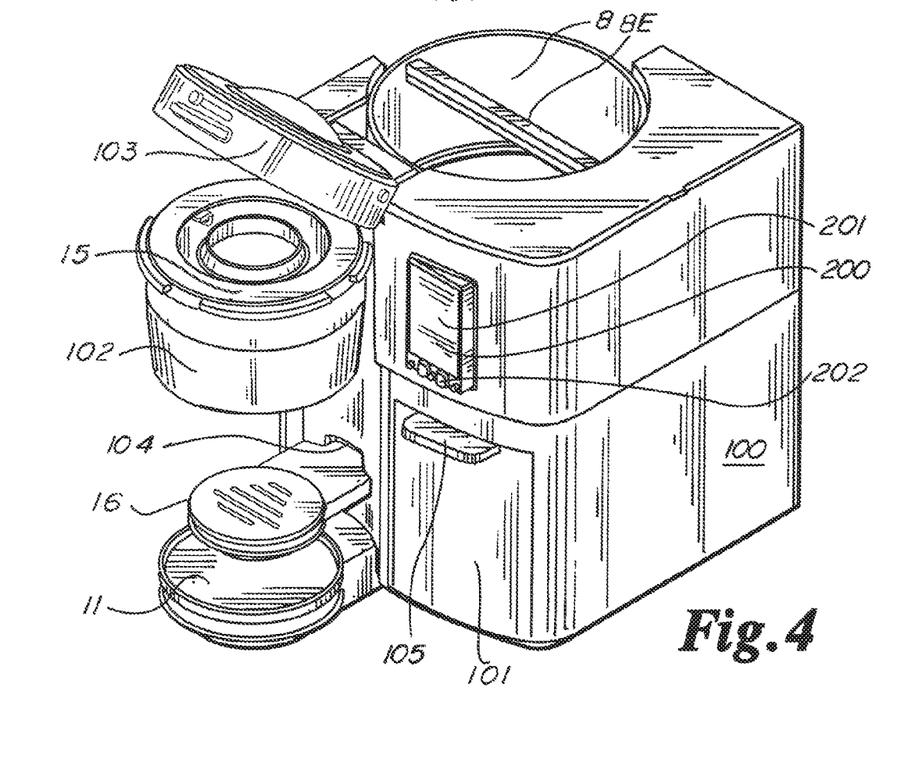
FIG. 4 is an isometric view of the coffee brewing apparatus of FIG. 1A shown with a single serve brewing chamber with the brew chamber lid hinged open exposing the brewing chamber used for single-serve brewing.
Figure 5:
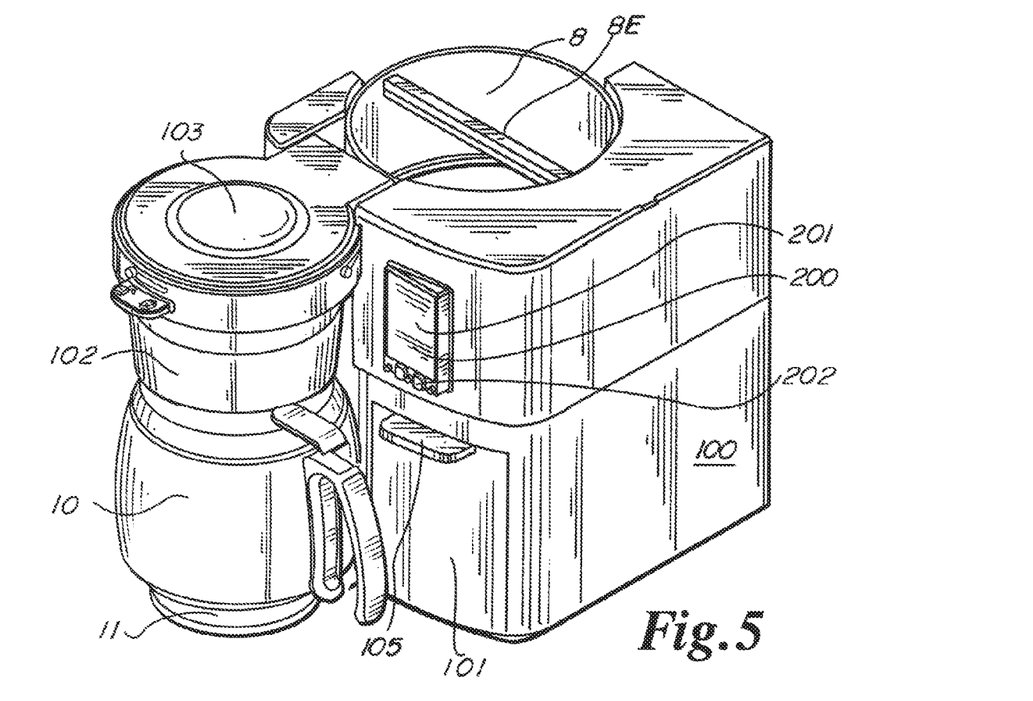
FIG. 5 is an isometric view of the coffee brewing apparatus of FIG. 1A shown with a carafe placed on the heating plate, under the brewing chamber.
Figure 6:
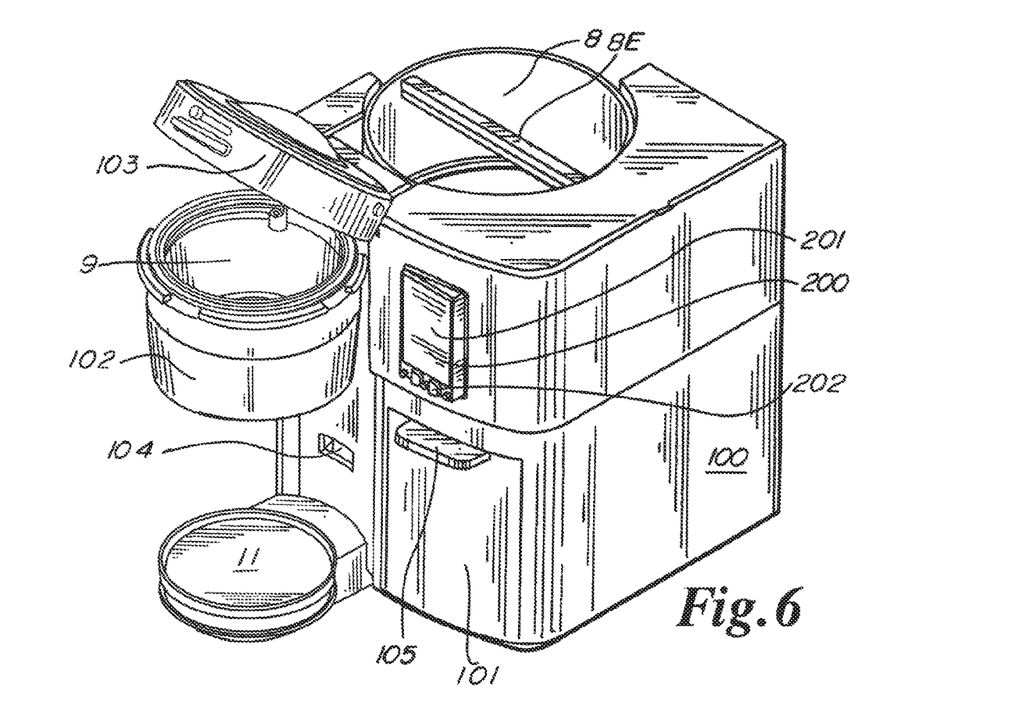
FIG. 6 is an isometric view of the coffee brewing apparatus of FIG. 1A shown with a brewing chamber with the brew chamber lid hinged open exposing the brewing chamber used for brewing into a carafe style container.

FIGS. 3 and 5 show the appliance during the brew cycle, with the mug 14 and the carafe 10 in position, whereas FIGS. 4 and 6 show the appliance with the lid 103 open, as would be seen when the user is getting ready to fill coffee into the brew chamber, prior to starting the brew cycle.

The appliance according to the present invention is programmed to brew coffee under a variety of conditions with the variables being:

1. The ratio of ground coffee to water.
2. The size of the brewed end-product. Varying from a small cup of about 4 oz. to a whole carafe of up to 60 oz.
3. The temperature at which coffee is being brewed.
4. The temperature at which a carafe maintains coffee after brewing.
5. The time that ground coffee is in immersed in water (the contact time).
6. The rate at which hot water is delivered into the brew chamber.
7. The maximum water temperature permitted based on the barometric pressure due to elevation.
8. Product diagnostic and user alerts.

Following are additional aspects of the appliance;
1. The ratio of ground coffee to water may be controlled since the brew basket sits on a load cell (A load cell is a transducer that is used to create an electrical signal whose magnitude is proportional to the force being measured). The various types of load cells include hydraulic load cells, pneumatic load cells and strain gauge load cells. Thus, when the user fills the grounds-basket with ground coffee the logic of the appliance senses the amount of coffee and stores it for determining the amount of water to be dispensed for brewing according to the strength or other qualities of the brew the user specifies. In fact, the appliance may display the weight of the ground coffee as it is being poured, and may be programmed to alert the user when a desired amount is reached.

2. The coffee brewing appliance will deliver as little brewed coffee as a mall cup of about 4 oz., or up to a whole carafe of up to 60 oz. following the user command. It was found beneficial to limit the boiler size in the appliance to contains up to 20 oz. (600 ml) of hot water, however if the user desires to brew a whole carafe the boiler will be emptied and refilled and reheated as many times as is needed to provide as much coffee as desired. For example, if a user specifies a carafe volume of say 1500 milliliter then the logic will alert the user whether the right amount of ground coffee was used and encourage the user to add more or to remove some prior to starting the brew process. The logic may also be programmed to account for the weight of water that will remain in the ground coffee at the end of the cycle and to use that information to determine the amount of water that must be delivered into the brew basket to achieve the desired amount of brewed coffee. The logic may also determine at how many times the boiler is to be filled and emptied and at what rate should the hot water be delivered to keep an optimal contact time. If for example, the user is looking to brew a single cup of just 4 oz. the logic will slow down the water delivery into the brew basket to maximize the contact time. The logic might alert the user that to obtain a desired coffee strength the amount of ground coffee should be increased to make up for the short brew time. The logic may also be programmed to elevate the brewing temperature to make up for the short brew cycle, as it is known that higher infusion temperature extract more aromatic substances from the ground coffee.

3. The appliance may be programmed to optimize the delivery rate and time to stay within the contact time prescribed by the SCAA. In case the user inputs brewing condition that would result in a brew cycle that falls outside the SCAA limits the appliance may be programmed to display a notice to that effect. It will be up to the user to allow the appliance to correct the condition or to accept the brewing conditions as specified by the user.

4. The temperature at which coffee is being brewed may be controlled to affect the brew product taste and strength. While it is recommended that coffee be brewed at 92 C+/−3 C. it turns out that by brewing at lower temperatures certain of the organic oils in the coffee are not extracted resulting in a different flavor to the coffee. It may therefore be very important to program the coffee maker to offer that option to the user who desires a coffee with a different profile than the traditional coffee. It was also determined that when brewing a whole carafe, the coffee strength may exceed the desired value. Therefore, the coffee maker may be programmed so that when brewing a whole carafe, a brew temperature of say 87 C would become the default temperature for a milder coffee. It is also understood that the user may override that default condition if a higher brew temperature would be desired.

5. The temperature at which a carafe maintains coffee after brewing is a parameter that depends on the drinking habits of the user. For example, people who add a generous amount of milk to their coffee would like to maintain the carafe at a higher temperature than people who drink their coffee black. Furthermore, people who desire to consume several cups of coffee over a stretch of say one hour would benefit from keeping the carafe at a lower temperature to slow down the oxidation process. The user may be prompted to describe their drinking habits so that the logic would adjust the temperature of the coffee in the carafe accordingly.

6. The time that ground coffee is contacted by water during the infusion process (the contact time) is a factor that affects the strength of the coffee, the longer the contact time the more organic oils are infused and the stronger the coffee. As mentioned above the SCAA specifies that when brewing a carafe of coffee, the contact time should remain within the limits of 4 and 8 minutes. The rate at which hot water is delivered into the brew chamber helps in maintaining better brew quality by increasing and decreasing the contact time. Since the brewing system according to the invention employs an air pump which delivers air into the boiler to displace a given amount of hot water the speed of the air pump which determines the rate of water dispensing may be varied by the control circuit. It is well known that water boils at different temperatures based on elevation. For example, in Denver CO water will boil at about 95-96 C, while at sea level water boils at 100 C. A pressure transducer that is one of the sensors employed by the coffee-making appliance, will sense the difference in atmospheric pressure and will signal that to the program, which will limit the upper temperature of water delivery to several degrees below the boiling temperature at the sensed atmospheric pressure. An alert may also be transmitted to the user.

7. The pressure transducer may also be used to determine unusual brewing conditions, such as: detecting a high back pressure in the brew chamber caused by using coffee that has been ground too finely. Hot water lines being clogged from excessive lime build up in the system. Improperly latched brew chamber and other unusual occurrences. The logic system may be programmed to alert the user, and to suggest corrective measures.

Since the relationship between the variables discussed above and the quality of the brewed beverage are known to those who are experienced in the art of coffee infusion, it is herein made possible to design various programs that tie different performance parameters with different flavors of the brewed beverage. That way the user may choose a given profile for the brewed beverage and the program will the parameters to be modified to achieve the desired profile.

The interface with the user can be achieved in several ways, for example through an interactive display where the user may select:

Size of brewed beverage, which may range from a 4-oz. cup to a 60oz. carafe.

Strength of the brewed beverage, which may range from mild to strong, or by the percentage of dissolved solids in the beverage (for people who are experienced with that nomenclature)

Character of the end-product, which may range from sweeter to more bitter.

Temperature of the end-product, in degrees or by scale.

Once a user selects the profile of the brewed beverage that fits their needs the user can lock that profile and name it for future selection. A user may select more than one profile; say one for the morning and one for the evening. The program will store that information so it may be retrieved by the user.

The programming and the user interface described above may also be stored in an app that may be downloaded to a smart phone, table or computer which may interact with the coffee making appliance according to the invention using, for example, Wi-Fi or Bluetooth wireless communication.

Figure 7A:
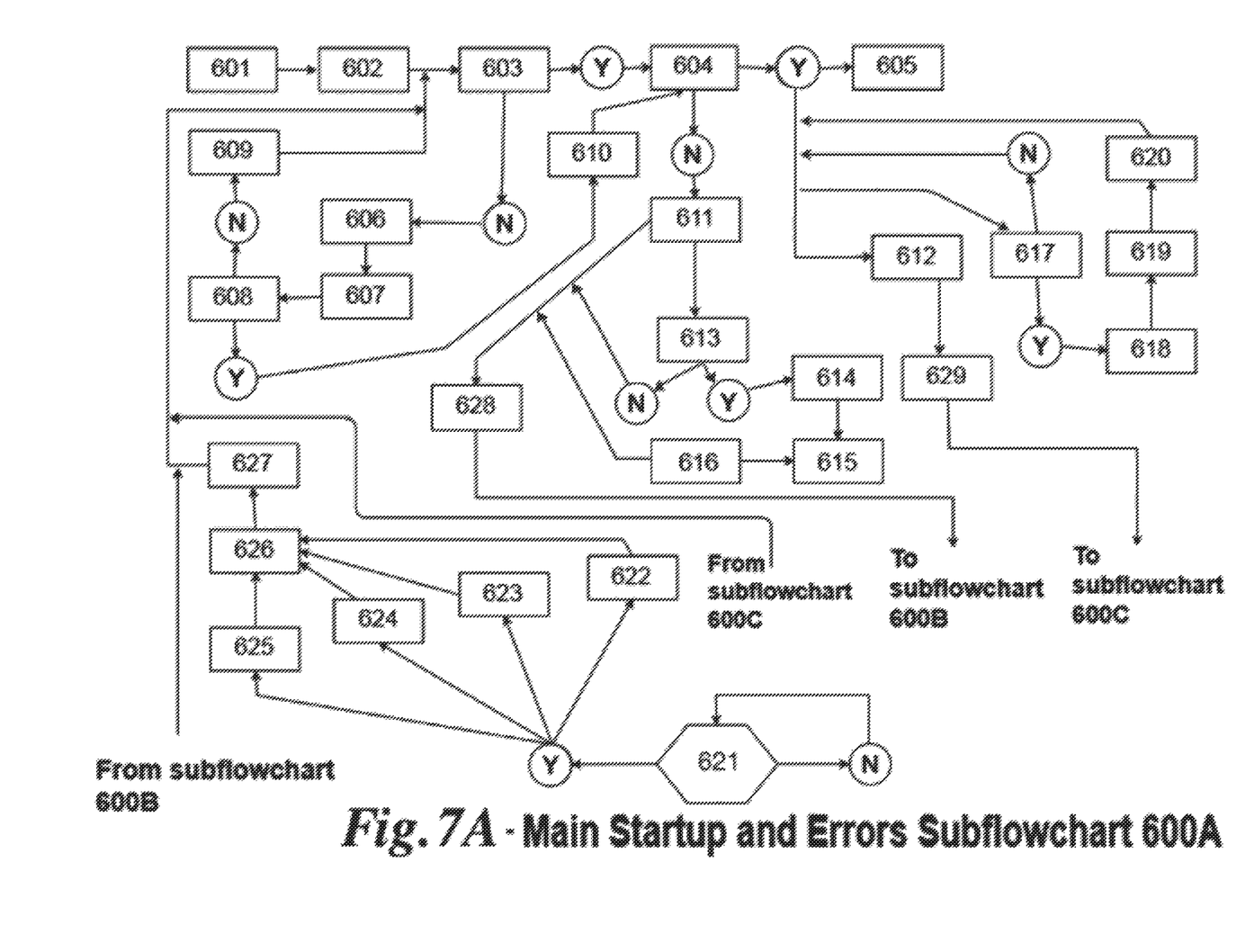
FIG. 7A is a first partial process flowchart for the coffee being apparatus of FIG. 1A.
Figure 7B:
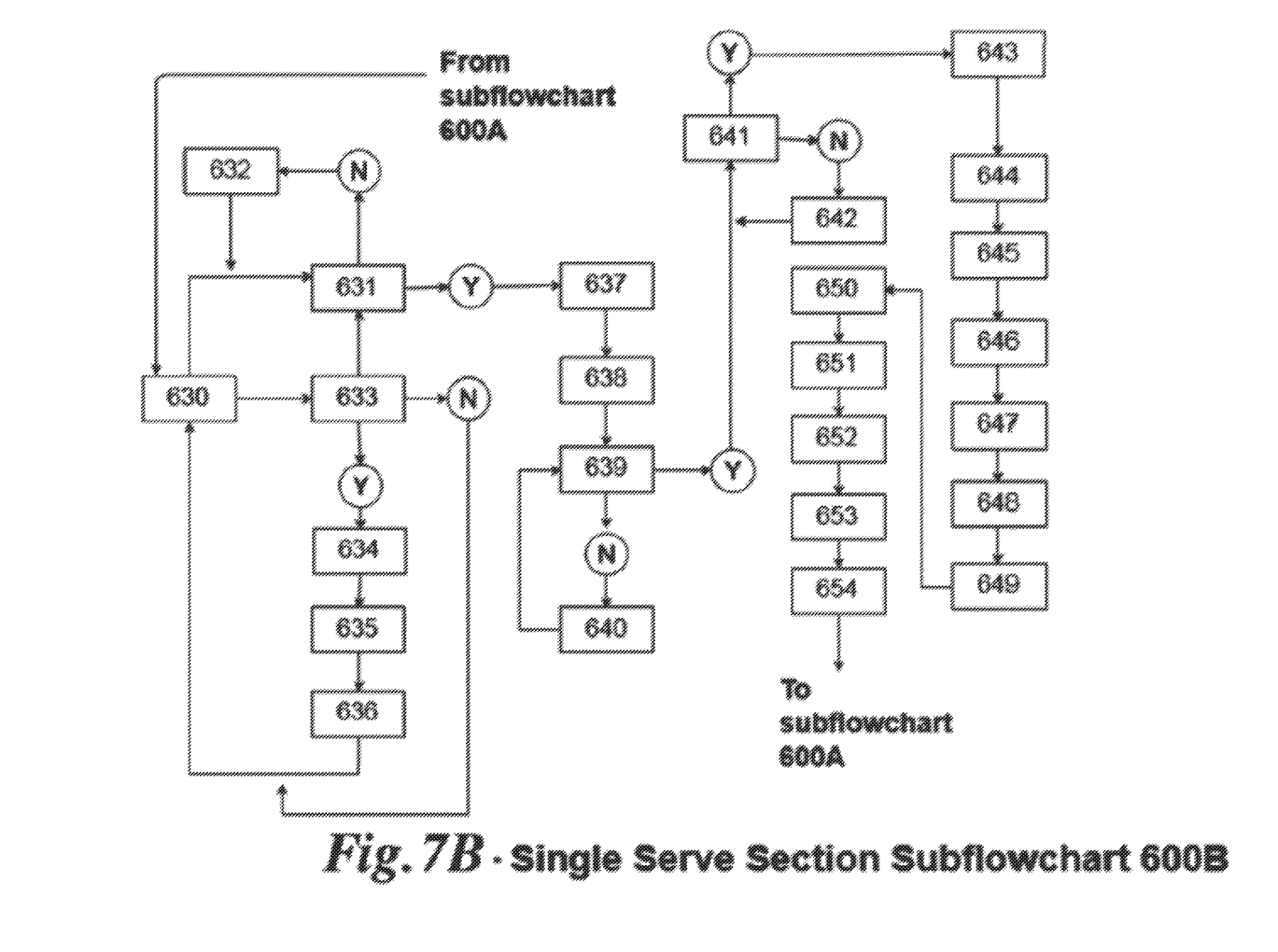
FIG. 7B is a second partial process flowchart for the coffee being apparatus of FIG. 1A.
Figure 7C:
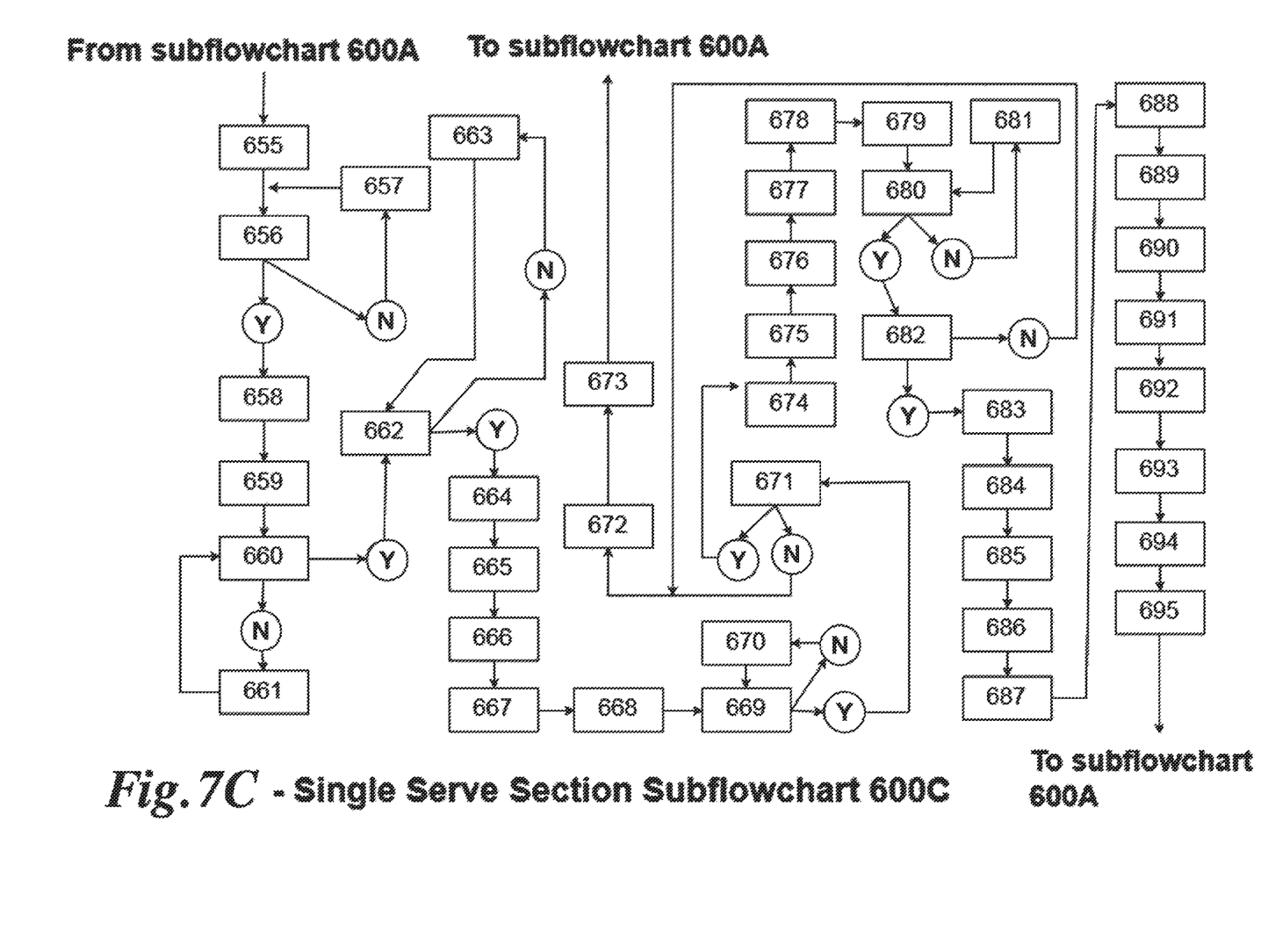
FIG. 7C is a third partial process flowchart for the coffee being apparatus of FIG. 1A.

FIGS. 7A through 7C, when taken together provide a process flowchart for the coffee brewing apparatus of the previous figures. Because the entire flow chart is so large, it is separated into three sub-flowcharts for legibility; the Main Start-up portion 600A of FIG. 7A, the Single-Serve portion 600B of FIG. 7B, and the Carafe portion 600C of FIG. 7C. Also, because the individual functional elements and decision points cannot be legibly labeled, each is assigned an item number according to the following list;

Main Startup Subflowchart 600A:

601—The user turns on power to the brewer.

602—The system checks atmospheric pressure and sets the heater algorithm based on pressure reading.
603—Is the top read sensor being sensed?
604—Is the system sensing the weight of the carafe?
605—The system begins heating the water to its resting temperature.
606—Is the valve opening?
607—Is the system pausing to refill with water?
608—Is the top read sensor being sensed?
609—Is the system's GUI requesting the user to refill the reservoir?
610—Is the valve opening?
611—The system begins heating the water to its resting temperature.
612—Is the system's GUI requesting the user to refill the reservoir?
613—The system checks if 0.5 psi has been exceeded inside the system while heating the water.
614—Is the valve opening?
615—Is the systems pausing for two seconds?
616—Is the valve closing?
617—The system checks if 0.5 psi has been exceeded inside the system while heating the water.
618—Is the valve opening?
619—Is the systems pausing for two seconds?
620—Is the valve closing?
621—The system checks if 0.5 psi has been exceeded inside the system while heating the water.
622—Is power being cut from the heater?
623—Is the valve opening?
624—Is air pump number one turning off?
625—Is the GUI indicating a failure due to over pressure?
626—Is the system pausing to refill with water?
627—Is the valve closing?
628—The user presses "GO" to go to the GUI's selectable single serve settings.
629—The user presses "GO" to go to the GUI's selectable carafe serve settings.

Single Serve Section 600B:
630—The cup brew process begins with user selections of brew temperature and desired delivery amount.
631—Is the system checking if the boiler is at the correct resting temperature?
632—Is the system heating the water heater to the correct temperature?
633—The system checks if 0.5 psi has been exceeded inside the system while heating the water.
634—Is the valve opening?
635—Is the system pausing for two seconds and checking for standby atmospheric pressure before start of brew?
636—Is the valve closing?
637—The brew button is pressed to start brewing.
638—Is the brew process beginning?
639—Is the coffee grounds sensor checking for the proper grounds amount is present?
640—Is the GUI displaying to the user to fill the grounds container to the proper amount of coffee grounds?
641—Is the system determining if the user's selected brew temperature has been achieved?
642—Is the system heating the water until the desired water temperature is achieved?
643—Air pump number one is turned on.
644—Is the correct desired coffee output based on read sensors or algorithm or combination of read sensor and algorithm?
645—Air pump number one turns off
646—Is the end of the brew process?
647—Is the valve opening?
648—The air delivery cycle begins.
649—Air pump number one or number two is turned on, whereas pump number one relies on a valve to switch from water dispense to air delivery to the grounds chamber.
650—Is the systems pausing for two seconds?
651—Air pump number two is turned on.
652—Air pump number one or two is turned off indicating the end of the air blast cycle to purge system of remaining coffee liquid.
653—Is the heater refilling with water and heating the water while the valve is open at 647?
654—Is the valve closing?

Carafe Section 600C:
655—The carafe brew process begins with user selections of brew temperature and desired delivery amount.
656—Is the system checking if the heated water is at the correct resting temperature?
657—Is the system heating the water heater to the correct temperature?
658—The brew button is pressed to start brewing.
659—Is the brew process beginning?
660—Is the coffee grounds sensor checking for the proper grounds amount is present?
661—Is the GUI displaying to the user to fill the grounds container to the proper amount of coffee grounds?
662—Is the coffee grounds sensor checking for the proper grounds amount is present?
663—Is the GUI displaying to the user to fill the grounds container to the proper amount of coffee grounds?
664—Air pump number one is turned on.
665—Is the correct desired coffee output based on read sensors or algorithm or combination of read sensor and algorithm?
666—Air pump number one turns off
667—Is the valve opening?
668—Is the system pausing for two seconds and checking for standby atmospheric pressure before start of brew?
669—Is the system determining if the heated water has achieved the desired temperature?
670—Is the system heating the water until the desired water temperature is achieved?
671—Is the top read sensor being sensed?
672—Is the valve closing?
673—Is the system's GUI indicating an error and requesting the user to refill the reservoir?
674—Is the valve closing?
675—Air pump number one turns on.
676—Is the correct desired coffee output based on read sensors or algorithm or combination of read sensor and algorithm?
677—Air pump number one is turned off.
678—Is the valve opening?
679—The system pauses to refill water.
680. Is the system determining if the user's selected brew temperature has been achieved?
681—Is the system heating the water until the desired water temperature is achieved?
682—Is the top read sensor being sensed?
683—Is the valve closing?
684—Air pump number one is turned on.
685—Is the correct desired coffee output based on read sensors or algorithm or combination of read sensor and algorithm?
686—Air pump number one is turned off.
687—Is the valve opening?
688—The air delivery cycle begins.

689—Air pump number one or number two is turned on, whereas pump number one relies on a valve to switch from water dispense to air delivery to the grounds chamber.

690—Is the systems pausing for two seconds?

691—Air pump number one or two is turned off indicating the end of the air blast cycle to purge system of remaining coffee liquid.

692—Indicates the end of the air blast cycle to purge system of remaining coffee liquid.

693—Is the heater refilling with water and heating the water while the valve is open at 647?

694—Is the valve closing?

695—Is the system's GUI requesting the user to refill the reservoir?

The Main Start-up section 600A is shown is FIG. 7A and begins at the top left of the chart when the user powers the machine at 601. It runs through a number of checks and operations; checking atmospheric pressure to determine the geographic elevation and using that information to set the boiler temperature's max setting in 602, determining if the boiler has been filled in 603, checking for the presence of the carafe grounds insert, or the presence of the cup grounds insert at 604, beginning the heating cycle in 605, and always ensuring pressure never exceeds a predetermined maximum at 617.

The Single Serve section 600B is shown in FIG. 7B and begins at the middle, left side of the chart with the process of making a single sized cup of coffee at 630; this is preceded by 628 from the Main Startup Section 600A shown in FIG. 7A. The user inputs the desired brew temperature and delivery amount into the machine's GUI at 630. Using this information, the system determines if the correct amount of grounds is present at 639, and, if required, asks the user to fill the grounds container with the determined amount required to satisfy the weight sensor 640. Before starting the brew process, the system determines if it is at a standby atmospheric pressure range at 635. If the atmospheric pressure is within range at 635, the system heats the water in the heater until it reaches the proper temperature 642 which was predetermined by the user at 630. The system runs the air pump to deliver water through the coffee grounds in 643. After the algorithm determines that the proper amount of coffee has been delivered in 644, it either turns on a second air pump, or, more likely, switches a valve to send air from air pump one directly into the brew chamber at 649. This process will purge the remaining liquid out of the grounds container, thereby leaving the grounds dry and easier to clean.

The Carafe Section 600C is shown in FIG. 7C and begins in the top left corner of the chart and begins with the process of making a carafe of coffee at 655 which is preceded by 629 from the Main Startup Section 600A shown in FIG. 7A. The carafe section does all of the same pre-checks that the Single Serve section does, and then begins the delivery process at 659. After the boiler has been emptied the system allows it to refill at 679. This process is repeated until the desired carafe amount, up to 1500 ml, is delivered to the carafe. After the last dispensing cycle the system performs the same air blast procedure to dry the grounds starting the purging process at 688 and ending the cycle at 692.

While the invention has been shown and described with reference to the specific exemplary embodiment shown, various changes in form and detail may be made without departing from the spirit and scope of the invention, and that the invention should therefore only be limited according to the following claims, including all equivalent interpretation to which they are entitled.

We claim:

1. An apparatus for making infused beverages comprising:
   a water heating container with an electric heater and a water level sensor;
   a water reservoir in fluid communication with the water heating container;
   a beverage receiving container;
   an infusible materials container;
   an air delivery system including a pump and valving;
   a conduit for providing water from the water heating container through the infusible materials container;
   a thermal sensor in communication with the water container;
   a weight sensor in communication with the infusible materials container;
   a pressure sensor in communication with ambient pressure and the conduit;
   a user control interface; and
   a processor in communication with the user control interface, the heater, the pump, the valving, the thermal sensor, the weight sensor, the water level sensor, and the pressure sensor;
   wherein the processor is adapted to receive input parameters from the user control interface and measurements from the thermal sensor, the weight sensor, the pressure sensor, and the water level sensor, and to control the heater, the valving and the pump according thereto.

2. The apparatus of claim 1 wherein the processor controls pumping time according to the received input parameters and measurements.

3. The apparatus of claim 1 wherein the processor controls a volume of water delivered from the water heating container into the infusible materials container according to the received input parameters and measurements.

4. The apparatus of claim 1 wherein the processor controls a pumping rate according to the received input parameters and measurements.

5. The apparatus of claim 1 wherein the processor controls a heater on time according to the received input parameters and measurements.

6. The apparatus of claim 1 wherein the processor controls a heater power level according to the received input parameters and measurements.

7. The apparatus of claim 1 wherein the input parameters from the user control interface include a beverage strength input and the measurements from the weight sensor include an infusible-materials weight measurement; and
   the processor compares the beverage strength input to the infusible materials weight measurement to control one or both of a pumping time and a pumping rate according thereto.

8. The apparatus of claim 1 wherein the input parameters from the user control interface include a beverage temperature input and the measurements from the thermal sensor include a water temperature measurement; and
   the processor compares the beverage temperature input to the water temperature measurement to control one or both of a heater on time and a heater power level according thereto.

9. The apparatus of claim 1 wherein the input parameters from the user control interface include one or both of a beverage strength input and a beverage temperature input, and the measurements from the weight sensor include an infusible materials weight measurement, from the thermal sensor include a water temperature measurement, and from the pressure sensor include an ambient pressure measurement; and wherein the processor compares one or both of the beverage strength input and the beverage temperature input to one or more of the infusible materials weight measurement, the water temperature measurement, and the ambient pressure measurement, to control one or more of a heater on time, a heater power level, a pumping time, and a pumping rate according thereto.

10. The apparatus of claim 1 wherein the infusible materials are ground coffee and the input parameters from the user control interface include a default coffee beverage quality input and the measurements from the thermal sensor include a water temperature measurement, from the weight sensor include a ground coffee weight measurement, and from the pressure sensor include an ambient pressure measurement; and wherein the processor compares the default coffee beverage quality input to the water temperature measurement, the ground coffee weight measurement, and the ambient pressure measurement to control one or more of a heater on time, a heater power level, a pumping time, and a pumping rate, and to deliver a coffee beverage to the beverage receiving container that is in accordance with Specialty Coffee Association coffee standards according thereto.

11. The apparatus of claim 1 wherein the user control interface is separate from or separable from the apparatus and adapted for wireless communication with the processor.

12. The apparatus of claim 1 wherein the beverage receiving container is one of a cup, a carafe, or selectably interchangeable therebetween, and the input parameters from the user control interface include a beverage quantity input and the processor controls one or more of a heater on time, a heater power level, a pumping time, and a pumping rate according thereto.

13. The apparatus of claim 1 wherein the input parameters from the user control interface include one or both of a beverage strength input and a beverage quantity input, and the measurements from the weight sensor include an infusible materials weight measurement, and from the water level sensor include a water level measurement; and wherein the processor compares one or both of the beverage strength input and the beverage quantity input to one or both of the infusible materials weight measurement and the water level measurement, to control one or more of a heater on time, a heater power level, a pumping time, and a pumping rate according thereto.

14. The apparatus of claim 1 further comprising a beverage receiving container temperature sensor and a beverage receiving container heater, and wherein the input parameters from the user control interface include a beverage receiving container temperature input, and the measurements from the beverage receiving container temperature sensor include a beverage receiving container temperature measurement; and wherein the processor compares the beverage receiving container temperature input and the beverage receiving container temperature measurement, to control one or both of a beverage receiving container heater on time and a beverage receiving container heater power level according thereto.

15. The apparatus of claim 1 wherein the measurements from the pressure sensor include a conduit pressure measurement, and the processor causes a warning signal when the conduit pressure measurement exceeds a predetermined pressure level.

16. An apparatus for making infused beverages comprising:
a water heating container with an electric heater and a water level sensor;
a water reservoir in fluid communication with the water heating container;
a beverage receiving container comprising one of a cup, a carafe, or selectably interchangeable therebetween;
an infusible materials container;
an air delivery system including pump and valves;
a conduit for providing water from the water heating container through the infusible materials container;
a thermal sensor in communication with the water container;
a weight sensor in communication with the infusible materials container;
a pressure sensor in communication with ambient pressure and the conduit;
a user control interface; and
a processor in communication with the user control interface, the heater, the pump, the valves, the thermal sensor, the weight sensor, the water level sensor, and the pressure sensor;
wherein the processor is adapted to receive input parameters from the user control interface and measurements from the thermal sensor, the weight sensor, the pressure sensor, and the water level sensor and to control the heater, the valves and the pump according thereto.

17. The apparatus of claim 16 wherein the input parameters from the user control interface include a beverage strength input and the measurements from the weight sensor include an infusible materials weight measurement; and wherein the processor compares the beverage strength input to the infusible materials weight measurement to control one or both of a pumping time and a pumping rate according thereto.

18. The apparatus of claim 16 wherein the input parameters from the user control interface include one or both of a beverage strength input and a beverage temperature input, and the measurements from the weight sensor include an infusible materials weight measurement, from the thermal sensor include a water temperature measurement, and the from the pressure sensor include an ambient pressure measurement; and wherein the processor compares one or more of the beverage strength input and the beverage temperature input to one or more of the infusible materials weight measurement, the water temperature measurement, and the ambient pressure measurement, to control one or more of a heater on time, a heater power level, a pumping time period, and a pumping rate according thereto.

19. The apparatus of claim 16 wherein the infusible materials are ground coffee and the input parameters from the user control interface include a default coffee beverage quality input and the measurements from the thermal sensor include a water temperature measurement, from the weight sensor include a ground coffee weight measurement, and from the pressure sensor include an ambient pressure measurement; and wherein the processor compares the default coffee beverage quality input to the water temperature measurement, the ground coffee weight measurement, and the ambient pressure measurement to control one or more of a heater on time, a heater power level, a pumping time and a pumping rate, and to deliver a coffee beverage to the beverage receiving container that is in accordance with Specialty Coffee Association coffee standards according thereto.

* * * * *